No. 896,878. PATENTED AUG. 25, 1908.
A. E. WOODHOUSE.
CONDUIT FOR ELECTRIC CONDUCTORS.
APPLICATION FILED MAR. 10, 1906.
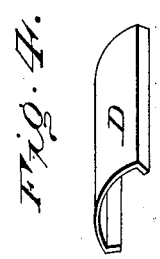
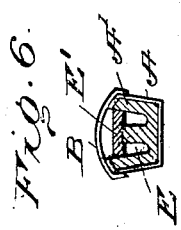
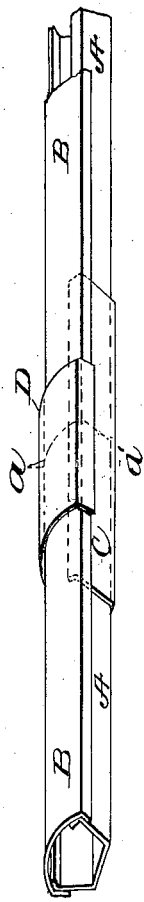
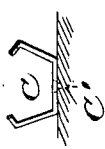

UNITED STATES PATENT OFFICE.

ALBERT ERNEST WOODHOUSE, OF KEW, VICTORIA, AUSTRALIA.

CONDUIT FOR ELECTRIC CONDUCTORS.

No. 896,878.   Specification of Letters Patent.   Patented Aug. 25, 1908.

Application filed March 10, 1906. Serial No. 305,280.

*To all whom it may concern:*

Be it known that I, ALBERT ERNEST WOODHOUSE, a subject of the King of Great Britain and Ireland, residing at "Amuri", Wellington street, Kew, in the British State of Victoria, Commonwealth of Australia, electrical engineer, have invented a certain new and useful Improved Conduit for Electric Conductors, of which the following is a specification.

This invention of an improved conduit for electric conductors has been designed mainly for wiring houses,—and buidings. It is preferably made of thin metal in suitable lengths and composed of a troughing of tapering channel section, clip pieces for securing the troughing in position, removable covers which are held in position by being sprung over the upper marginal edges of the troughing, and joint caps for closing the joint between covers. Said form of cover allows of the wires being readily laid and inspected, also the end parts of the troughing are secured together and held in position by said close fitting joint clips, and further each joint cap, over the cover joint like the cover proper, is sprung into position and the whole of the parts being close fitting a thorough electric bond is secured. Further by insulating the internal walls and providing an insulating partition in the conduit, bare conductors may be laid therein.

The invention will now be described aided by a reference to the accompanying sheet of drawing in which;—

Figure 1 is a perspective view of a complete conduit, Fig. 2 is a perspective view of the conduit joint clip, and Fig. 3 an end view of same. Fig. 4 a perspective view of the cap piece. Fig. 5 a section on line *a a*—Fig. 1, and Fig. 6 a section of the conduit as fitted with insulating material to receive two conductors.

The troughing A which is of a tapering channel section is constructed of metal, preferably sheet metal, although other suitable material may be used in place of the metal, and is made in convenient lengths and provided with a removable cover B which is made to fit closely over the upper marginal edges of the sides of the troughing, and has to be sprung into position, so that when the conductors are laid and secured in the troughing its cover can be sprung on or be taken off for inspection purposes. The lengths of troughing are held together by means of clips C, into which they fit neatly and which clips are usually secured to the wall by screws or nails $C^1$, as shown in Fig. 3, and said clips grip the end parts of the adjoining lengths and act as electric bonds, while the covers serve a similar purpose.

D are the joint caps for bridging or covering the meeting ends of the cover sections, and these caps are sprung over the edges of the cover proper and hence fit closely thereon and assist to form the electric bond.

If the troughing is insulated with material $A^1$ suitable for being shaped to form one or more grooves E, as shown in Fig. 6, bare wires or lightly insulated wires may be laid in the grooves and a cover of insulating material $E^1$ laid or affixed over the grooves, and which covers may be coated with cement or other suitable material to prevent the ingress of moisture, after which the conduit cover will be secured in the manner before described.

If so desired after the troughing is completed, its cover may be further secured by the metal being sweated together.

If the conduits are constructed of material other than metal they should only be employed when the conductors are to be worked up to a pressure not exceeding say two hundred and fifty volts. For some purposes the cap piece D may be dispensed with, as the adjacent ends of the cover section B, can be otherwise joined. In all cases the metal surfaces in contact are left clean, or they are tinned to aid in the bonding.

The construction of conduits herein described may also be employed for curves, bonds and elbows.

Having now described my invention what I claim as new and desire to secure by Letters Patent is:—

1. An electric conductor conduit comprising a trough having a bottom and two longitudinal flat side walls diverging upwardly from said bottom, a cover for said trough having depending converging flat side flanges adapted to spring onto said trough and fit down on the outer faces of said diverging side walls, and a trough-like clip adapted to be secured to the wall and receive said trough fitting the side walls thereof, substantially as described.

2. An electric conductor conduit comprising a sheet metal trough having a bottom and side walls diverging upwardly from said bottom, a sheet metal cover having depending converging side flanges adapted to engage the inclined outer faces of said side walls, and a sheet metal clip adapted to be secured to the wall and formed with a floor and diverging side flanges adapted to engage the outer faces of said side walls, substantially as described.

3. An electric conductor conduit comprising a trough having upwardly diverging spring flat side walls, a cover therefor having longitudinal depending flat converging side flanges, said cover being adapted to spring onto said trough with said converging flanges fitting over the outer diverging faces of said flat side walls, and a clip adapted to be secured to the wall and having spring side walls to receive and hold said trough, substantially as described.

4. An electric conductor conduit comprising a sheet metal trough having upwardly diverging spring side walls, a sheet metal clip adapted to be secured to the wall and having upwardly diverging side walls adapted to engage the side walls of the trough, and a sheet metal cover having depending converging edge flanges fitting over the outer inclined faces of said trough and clip walls, substantially as described.

5. An electric conductor conduit comprising a sheet metal trough having side walls, a sheet metal clip adapted to receive and secure said trough and having side walls with longitudinal inturned flanges adapted to lap inwardly over the outer edges of said trough walls, means for securing said clip to the wall, and a sheet metal cover for said trough having depending side flanges to fit down at the exterior of said trough and clip walls, substantially as described.

6. An electric conductor conduit comprising a sheet metal trough having diverging flat side walls, a sheet metal clip adapted to be secured to a wall and having flat diverging side walls adapted to receive and secure said trough, a sheet metal cover for said trough having flat converging depending side flanges, and a sheet metal cap joint having flat converging side flanges adapted to fit over said cover and the flanges thereof, combined substantially as described.

In testimony whereof I have hereunto set my hand in presence of two subscribing witnesses.

ALBERT ERNEST WOODHOUSE.

Witnesses:
BEDLINGTON HODGCOMB,
W. J. S. THOMPSON.